United States Patent
Junier

Patent Number: 6,050,288
Date of Patent: Apr. 18, 2000

[54] SLIDE VALVE WITH WELDED INTERNALS

[75] Inventor: Marius Robert Junier, Houston, Tex.

[73] Assignee: Tapco International, Inc., Houston, Tex.

[21] Appl. No.: 09/376,119

[22] Filed: Aug. 17, 1999

Related U.S. Application Data

[63] Continuation-in-part of application No. PCT/US99/00825, Jan. 14, 1999, which is a continuation-in-part of application No. 09/007,666, Jan. 15, 1998, abandoned.

[51] Int. Cl.[7] .................................................. F16K 3/30
[52] U.S. Cl. ........................ 137/315; 137/375; 251/326; 251/329
[58] Field of Search ................... 251/326, 327, 251/328, 329; 137/375, 315

[56] References Cited

U.S. PATENT DOCUMENTS

| | | | |
|---|---|---|---|
| 3,726,306 | 4/1973 | Purvis | 251/329 X |
| 3,964,507 | 6/1976 | Jandrasi et al. | 251/326 X |
| 4,253,487 | 3/1981 | Worley et al. | 137/375 |
| 4,316,483 | 2/1982 | Jandrasi et al. | 137/315 |
| 4,458,879 | 7/1984 | Jandrasi | 251/326 |
| 4,512,363 | 4/1985 | Jandrasi et al. | 137/375 |
| 4,612,955 | 9/1986 | Purvis | 137/375 |
| 4,615,506 | 10/1986 | Houston | 251/326 |
| 4,693,452 | 9/1987 | Jandrasi | 251/326 X |
| 5,123,440 | 6/1992 | Houston et al. | 251/326 X |
| 5,301,712 | 4/1994 | Treichel et al. | 137/375 |
| 5,732,930 | 3/1998 | Fritz, Jr. | 251/326 X |

*Primary Examiner*—Stephen M. Hepperle
*Assistant Examiner*—John Bastianelli
*Attorney, Agent, or Firm*—James F. Weiler

[57] ABSTRACT

Disclosed is a slide valve for control of product flow through it in which the valve internals, an orifice plate and guide assembly, are maintained in position by a circumferentially extending attachment stub surrounding and welded to a circumferentially extending weld-on stub welded to the orifice plate, the circumferentially extending attachment stub being welded to an internal end of the support cone and to the weld-on stub whereby the internals may be released and removed through the bonnet area of the slide valve by cutting the weld between the attachment stub and the weld-on stub, and replaced through the bonnet area and rewelding the weld-on stub and the attachment stub with another fillet weld. This places the fillet weld under compression rather than under tension, and is much stronger than the tension fillet welds in previous embodiments of this slide valve. Also, the refractory material when used can be finished in the shop rather than on site.

5 Claims, 3 Drawing Sheets

6,050,288

SLIDE VALVE WITH WELDED INTERNALS

CROSS-REFERENCE TO RELATED APPLICATION

The present application is a continuation-in-part of International Application No. PCT/US99/00825 filed Jan. 14, 1999 (designating U.S. Continuation-in-Part National Patent), which is a continuation-in-part of Application Ser. No. 09/007,666 filed Jan. 15, 1998, abandoned.

FIELD OF THE INVENTION

The present invention is directed to slide valves utilized for controlling high temperature and high velocity flow.

BACKGROUND OF THE INVENTION

Slide valves utilized in controlling high temperature and high velocity flow of products through the valve have a number of disadvantages—for example, require seat plates and seat plate bolting, have seat plate distortion, and the utilization of bolting that is under load due to differential pressure in the valves and are only as strong as the bolting system strength of bolts resulting in seat plate distortion, do not have a positive seal against bypass from differential pressure, do not allow for proper alignment of the orifice plate, and do not provide for future expansion of the port opening.

PRIOR ART

The following patents represent the current state of the art with respect to slide valves.

Treichel et al., U.S. Pat. No. 5,301,712, discloses background information concerning slide valves, their applications, problems and the like of slide valves in the field of use of the present invention to which reference is made. It also discloses a slide valve assembly including an orifice and a slide valve slidable in the guides of the orifice plate assembly. The orifice plate assembly is slidable into and out of position in the slide valve housing through a side opening via grooves formed in the inner walls of the housing.

Houston et al., U.S. Pat. No. 5,123,440, discloses a slide valve for use in high temperature environments. The mounting ring of the slide valve is propped against the bed plate by a plurality of columns which are adjustable by screws connecting gussets to rails upon which the slide or disc slides.

Wiese, U.S. Pat. No. 5,096,099, discloses a slide valve with an adjustable cover that is connected at an opening to a container by a plurality of socket head screws.

Owens et al., U.S. Pat. No. 5,082,247, discloses a split seat gate valve located within a length of pipeline. The valve is disposed between flanged openings in the pipeline and is secured by a plurality of bolts.

Jandrasi, U.S. Pat. No. 4,693,452, discloses several embodiments of slide valves for high corrosive environments. In the most relevant embodiments, the orifice plate and guide rails of the slide valve are attached to the valve housing by a plurality of bolts that run parallel to the flow direction to connect the valve assembly.

Purvis, U.S. Pat. No. 4,612,955, discloses an edge wear tab used to prevent corrosion around the orifice in high temperature applications. Slides are slidably mounted in rails which are bolted to the valve housing.

Graf et al., U.S. Pat. No. 4,541,453, discloses a slide valve for high temperature gas lines. The internals are removed only by disassembly of the valve housing.

Jandrasi et al., U.S. Pat. No. 4,531,539, discloses a slide valve. The orifice plate of the slide valve is releasably secured in place by bolts running parallel to flow direction.

Jandrasi et al., U.S. Pat. No. 4,512,363, discloses a valve assembly wherein the valve internals (orifice assembly, valve seat, guides, and slide) are removably secured to the valve body by a clamping action. The clamping action is established by a valve liner which engages the orifice assembly and presses it into abutment with the valve body. A lower flange of the liner is removably positioned between the slide valve body and outlet member.

Jandrasi et al., U.S. Pat. No. 4,458,879, discloses a valve wherein the valve internals are held in position by a clamping action of a quick make-up cylinder. The orifice plate with guides for the slide is clamped to the valve body by a quick connect cylinder that screws into the valve body.

Worley et al., U.S. Pat. No. 4,253,487, discloses a slide valve using a pair of opposing discs to control fluid flow through the valve. The guide rails within which the discs slide are held in place by bolts that run parallel to the flow direction.

It would be advantageous to provide a slide valve which eliminates bolting that is under load to differential pressures in the valve, which is much stronger than a bolted system for maintaining the internals in position, which has positive sealing against by-pass from differential pressure, in which no seat plate is utilized thereby eliminating distortion from a seat plate, allows for future expansion of the port, is easier to remove and replace internals rather than one utilizing bolts which often gall, break, or are difficult to remove and replace, in which the internals are maintained properly aligned, and which may be used for all size valves.

SUMMARY OF THE INVENTION

The present invention is directed to such a slide valve in which product flow is controlled through the valve. The internals of the slide valve comprise the orifice plate with a circumferentially extending stub welded to it, and the guide assembly for the slide or disc, the orifice plate circumferential stub being connected by a weld assembly to an internal support cone which in turn is welded to the valve body. Preferably the orifice plate and the guide assembly are welded together into a monolithic or unitary structure, or the guide assembly is supported by the orifice plate by wrap around guides bolted or pinned to the orifice plate without the bolts or pins bearing any load. The internals, guide assembly, and orifice plate may be removed quickly and easily by cutting a welded connection of the weld assembly to the stubs and replaced by rewelding the stub connection to the support cone. The circumferentially extending stub can be welded either to the inside or outside of the internal end of the support cone. This permits high temperatures (1,000°F.+) and high pressure (50 psi+) transfer of product through the valve assembly having the above advantages and features. Further details and aspects of the slide valve of the present invention are set forth in the following description of preferred embodiments.

The embodiment of the present invention is an improvement in that the internals are welded in place by a fillet weld in compression due to flow through the chamber rather than in tension which is much stronger than a fillet well in tension as in the previous embodiments of the invention.

Also, advantageously the refractory material when used is located between and on the inside of the cone and the external surface of a circumferentially extending attachment stub and thus can be finished in the shop rather than on site.

Accordingly, it is an object of the present invention to provide such a slide valve which eliminates bolting under load subject to differential pressure in the valve.

It is a further object of the present invention to provide such a slide valve which is much stronger than slide valves using a bolted system to maintain the internals in place in the valve.

It is yet a further object of the present invention to provide such a slide valve which provides a positive seal against by-pass from differential pressure.

A further object of the invention is to provide such a slide valve which eliminates a seat plate and seat plate bolting and hence has no seat plate distortion.

A still further object of the invention is the use of stubs welded to the orifice plate and support cone which allows proper alignment of the port or orifice in the orifice plate.

A still further object of the present invention is the provision of such a slide valve in which the orifice plate and the valve slide are a unitary or monolithic structure.

It is still a further object of the present invention to provide such a slide valve in which the internals are easier to remove and replace than in current slide valves.

A further object of the present invention is that the internal parts are maintained in proper alignment.

It is yet a further object of the present invention to provide such a slide valve which may be utilized for all sizes of valves, which is suited for large, small, and medium sized valves.

It is an object and a feature of the present invention to provide such a slide valve in which the fillet weld securing the internals of the valve, the orifice plate and guide assembly, are under compression rather than tension resulting in a stronger weld than in the prior embodiments.

It is a further object of the present invention to provide such an improved slide valve in which the application of refractory material can be finished in the shop rather than in the field.

Other and further objects, features, and advantages are set forth and are inherent in the slide valve as set forth throughout the specification and claims.

DESCRIPTION OF THE PREFERRED EMBODIMENTS

Figure 1:
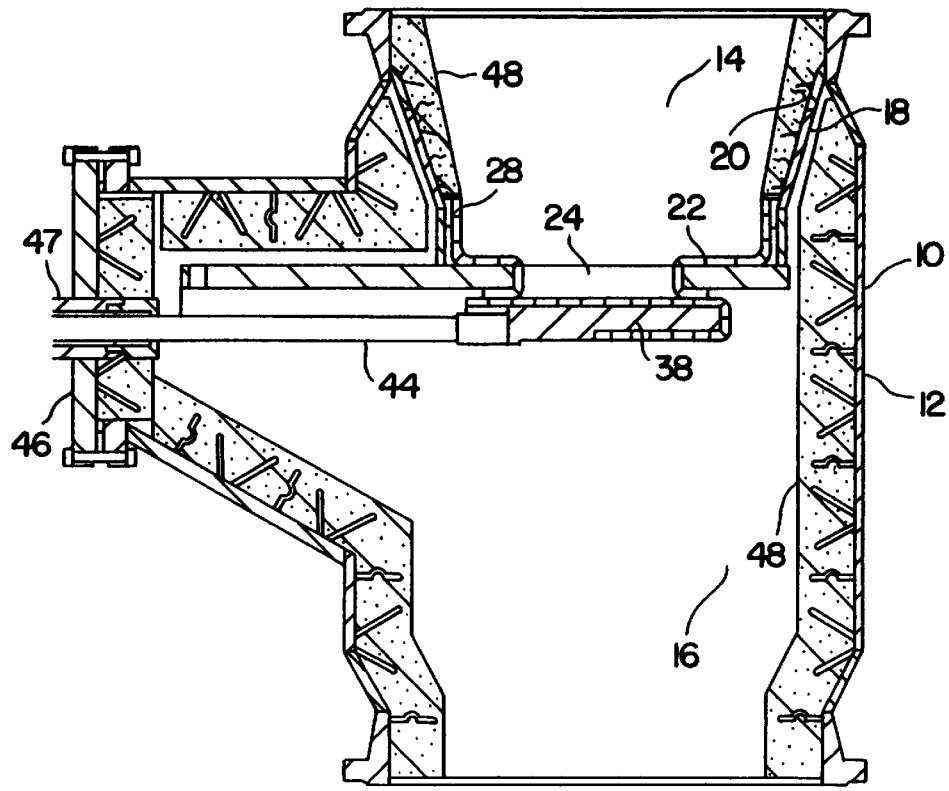
FIG. 1 is a side elevational view in section of a slide valve of the present invention.

Referring to FIG. 1, an improved slide valve 10 of the present invention is illustrated, which includes the valve body 12 which has an upstream entrance area 14 and the downstream outlet area 16. A support cone 18 having the entrance area 20 is welded to the valve body 12 adjacent its upstream entrance area 14. An orifice plate 22 having the orifice or port 24 and a circumferentially extending stub 28 is welded to the cone 18 as subsequently described.

Figure 2:
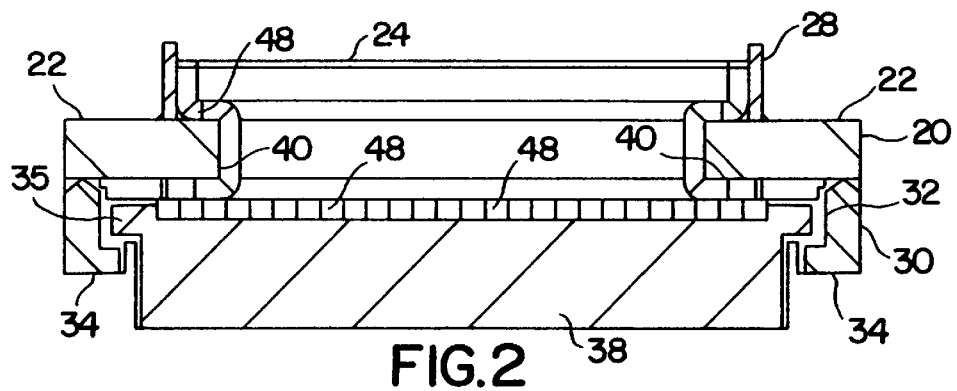
FIG. 2 is a cross-sectional view looking in from the bonnet area of the orifice plate and guide welded together into a monolithic or unitary structure according to the invention.

Referring now to FIG. 2 illustrating a preferred embodiment of the invention, the lower end of the support cone 18 has a flange 28 welded to it to which the upper end of the circumferential stub 26 is welded thereby securing the orifice plate 22 to the lower end of the support cone 18.

Referring again to FIG. 2, combined by welding to the orifice plate 22 is a guide assembly 30 providing the inwardly facing recess 32 formed by the inwardly facing projection 34 and the orifice plate 22, the projection 34 coacting with the orifice plate 22 to provide the groove 32 which serve as guides for the slide 37 on the slide valve 38. Thus, the guide assembly 30 and the orifice plate 22 are welded together by the weld 42 into a unitary or monolithic structure.

The valve internals comprising the monolithic orifice plate 22 and guide assembly 30 are supported in position in the valve body by means of welding the stub 26 to the lower portion 28 of the support cone 18. Thus, the valve internals may be removed from the slide valve body 12 simply by cutting the weld at the top of the circumferential stub 26 and removing them through the bonnet 46 (FIG. 1), and then can be replaced by reinserting the valve internals, the unitary orifice plate 22 and guide assembly 30, into the valve body 12 through the bonnet 46 (FIG. 1) and rewelding the top of the circumferential stub 26 to the lower connection portion or flange 28 of the support cone 18. Preferably, the circumferential stub 26 is made tall enough so that the weld at the top of the stub 26 may be cut a number of times—for example, four times and replaced and rewelded each of these times.

In operation and referring again to FIG. 1, the slide or disc 38 is reciprocated by an actuator rod 44 which sealingly extends through the bonnet 46. The actuator rod can be actuated by any suitable means, not shown, and has a suitable stuffing box or sealing arrangement 47 for the actuator rod 44 which are conventional in valves of this type; and, accordingly, no description thereof is given or deemed necessary.

Figure 3:
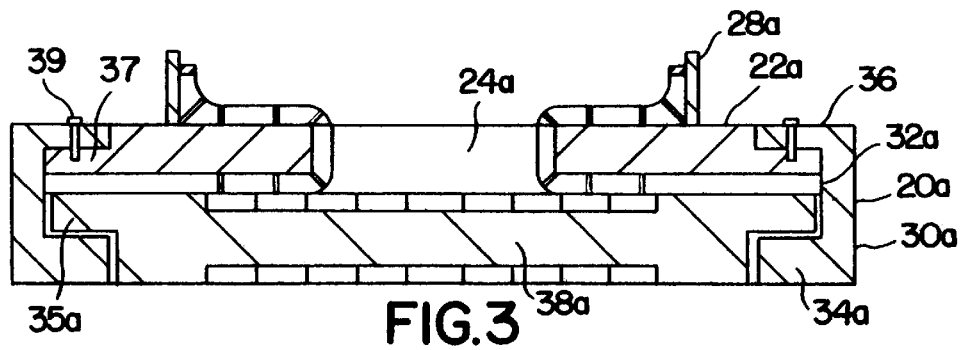
FIG. 3 is a cross-sectional view of a modification of the orifice plate and guide assembly according to the invention.

Referring now to FIG. 3, a modification is shown to the valve slide assembly where like parts to those of FIG. 2 are designated by the same reference numerals with the letter "a" added.

The upper portion of the valve guide assembly 30a has the inwardly-extending projection 36 which is supported on the outer recessed portions 37 of the orifice plate 32a and held in position by the threaded bolts or pins 39. Thus, the guide assembly 30a is supported and held in place by the wrap around projections 34a and 36 and are held in position by bolts or pins 39 which are not under load. The remaining parts and functions of the modification of FIG. 3 are the same as that of FIG. 2, and no further description thereof is deemed necessary or given.

The valve body 12 is lined with refractory material 48 when used at high temperature. Any refractory material having sufficient strength can be used for the liner and is available from a number of suppliers, including Harbison Walker (Pittsburgh, Pa.), National Refractories (Oakland, Calif.), Norton Co. (Worchester, Mass.), The Carborundum Co. (Niagara Falls, N.Y.), Resco Products, Inc. (Morristown, Pa.), Plibrico (Chicago, Ill.), and A. P. Green (Mexico, Mo.). Any such refractory material having a modulus of rupture (MOR) over about 1200 psi at normal operating temperatures (about 1400 to about 1900 psi is preferred) is suitable for use in the present invention; and many commercially available composites can either be modified by adding alumunina and/or zirconia to increase MOR or by varying such parameters as aggregate size, cooling rate, pressure, percentable solids, vibration frequency, all as are known in the art, to maximize the strength thereof for use in accordance with the present invention.

Figure 4:
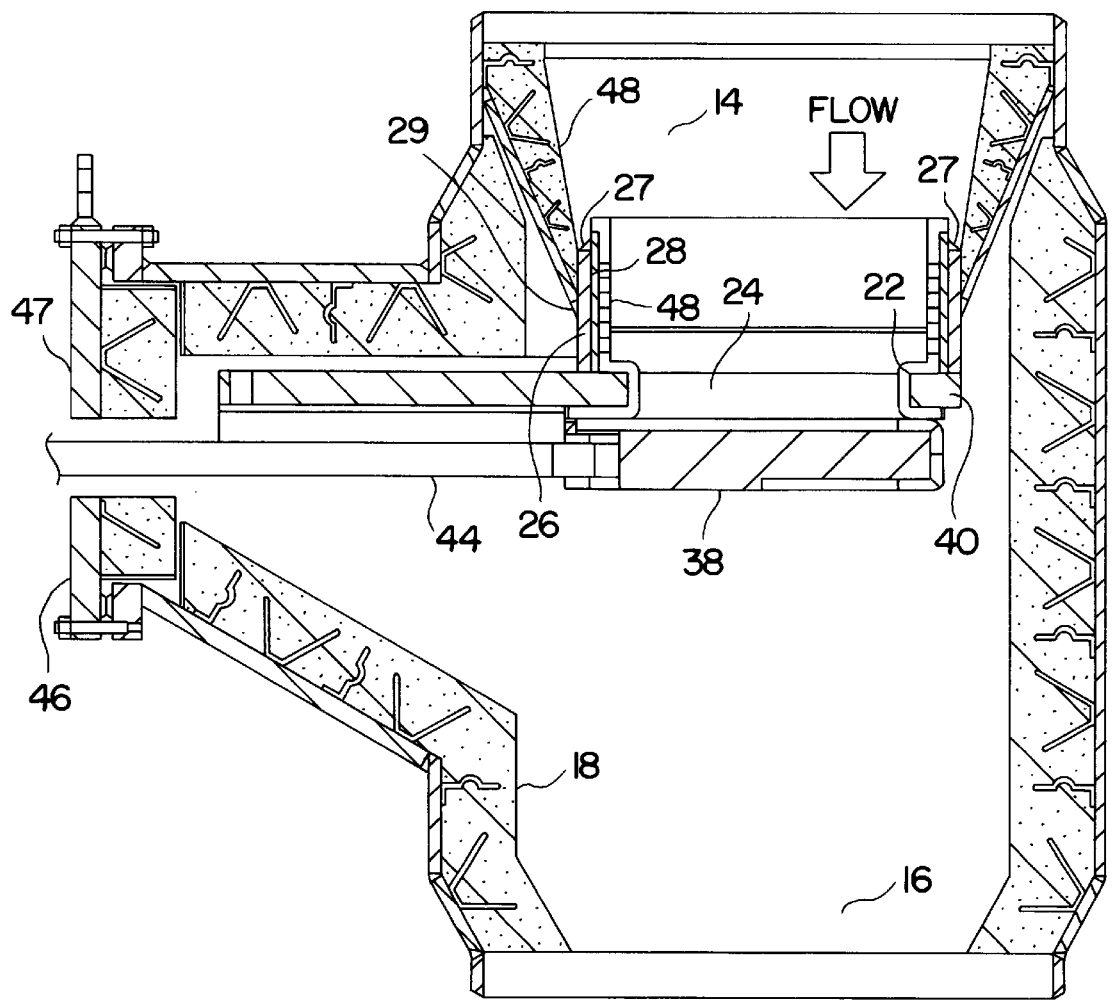
FIG. 4 is a view similar to FIG. 2 but is a view of the present embodiment of the invention in which the fillet weld securing the valve internals is in compression rather than tension and in which the refractory material can be finished in the shop rather than on site.

Referring now to FIG. 4 illustrating the presently preferred embodiment of the invention utilizing refractory material 48, the slide valve 10 of the present invention includes the valve body 12 which has an upstream entrance area 14 and the downstream outlet area 16 and a support cone 18 having the entrance area 20. The cone 18 is welded to the valve body 12 adjacent its upstream entrance area 14. The circumferentially extending weld-on stub 28 is welded to the orifice plate 22 having the orifice or port 24, and a circumferentially extending attachment stub 26 surrounds and is welded adjacent its upper end to the exterior surface of the circumferentially extending weld-on stub 26 by the fillet weld 27 and is welded to the cone 18 at its downstream end by the fillet weld 27.

Figure 5:
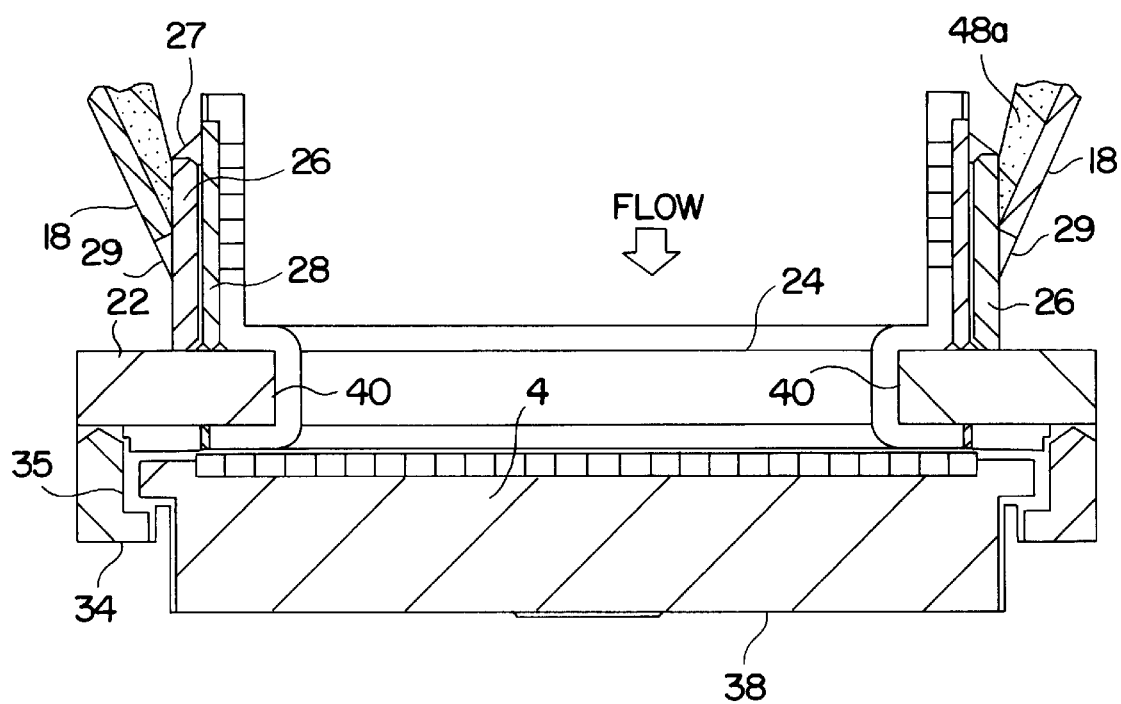
FIG. 5 is a cross-sectional view of the present embodiment of the slide valve illustrated in FIG. 4.

Referring now to FIG. 5 better illustrating the presently preferred embodiment of the invention, as mentioned previously, the attachment circumferentially extending stub 26 surrounds the annular weld-on stub 28 welded to the orifice plate 24, which is welded by the fillet weld 27 to the exterior surface of the weld-on stub 28 adjacent its upper end. However, the circumferentially extending attachment stub 26 is not welded to the orifice plate 22 but is welded by the fillet weld 29 to the cone 18 adjacent its lower end. Thus, the weld-on stub 28 is welded to the orifice plate 22, and the attachment stub 26 is welded to the weld-on stub 28 and to the cone 18 thereby welding the internals, the orifice plate 22 and guide assembly 30, to the body 12. Thus, the valve internals and weld-on attachment stub 26 can be removed through the bonnet 46 (FIG. 4) from the slide valve body 12 simply by cutting the fillet weld 27 between the weld-on attachment stub 28 and the attachment stub 26, and then can be replaced by reinserting the valve internals including the weld-on stub 28 through the bonnet 46 into the body 12, rewelding by a new attachment fillet weld, such as the fillet weld 27, adjacent the top of the circumferentially extending attachment stub 26 to the circumferentially extending weld-on stub 28.

The embodiment of the invention has the following advantages over the embodiments of FIGS. 1–3: The attachment fillet weld 27 securing together the circumferentially extending weld-on stub 28 and the circumferentially extending attachment stub 26 is in compression due to the force of flow through the flowway 14 rather than in tension which makes the fillet weld 27 much stronger than the welded embodiments of FIGS. 1–3; and when used, the refractory material 48 is disposed on the inside of the cone 18 and thus can be finished in the shop rather than on site since the annular attachment stub 26 is outside the annular weld-on stub 28.

As illustrated in FIGS. 4 and 5, the refractory material is also applied to the internal surface of the circumferentially extending weld-on stub 28. Any suitable refractory materials of FIGS. 1–3 described in connection with the embodiments of the invention illustrated in FIGS. 4 and 5 can be used which will withstand the conditions of use. Also, the refractory material 48 may be omitted, if desired, for example in applications and uses where refractory material is not required.

Accordingly, the present invention is well suited and adapted to attain the objects and ends and has the advantages and features mentioned as well as others inherent therein.

While presently preferred embodiments of the invention have been given for the purpose of disclosure, changes can be made therein and other uses thereof can be made which are within the spirit of the invention as defined by the scope of the appended claims.

What is claimed is:

1. An improved slide valve for control of flow therethrough comprising, a body having a valve chamber with an upstream entrance area and a downstream outlet area, a support cone having an entrance chamber connected to the body extending to adjacent the upstream entrance of the valve chamber and having a downstream end area, an orifice plate provided with an orifice, a circumferentially extending annular weld-on stub welded to the orifice plate extending upwardly from around the orifice, a circumferentially extending attachment stub surrounding and welded by a fillet weld adjacent its upper end to the annular weld-on stub, the fillet weld being in compression by flow through the slide valve, the support cone being welded adjacent its downstream end to an external surface of the circumferentially extending attachment stub, a guide assembly having a guide plate with an opening in alignment with the orifice of the orifice plate secured to the orifice plate, the guide assembly having inwardly extending guides, a valve slide having outwardly extending slides disposed in the inwardly extending guides, whereby the orifice plate, guide assembly, and circumferentially extending weld-on stub can be released as a unit by cutting the fillet weld and withdrawn through the bonnet area, and replaced through the bonnet area and welding the circumferentially extending weld-on stub to the circumferentially extending attachment stub by a fillet weld.

2. The improved slide valve of claim 1 including, a lining of refractory material forming a flow-way therethrough lining inner walls of the body, the support cone, and the slide valve, the refractory material extending to the circumferentially extending attachment stub's external surface and to the support cone's internal surface.

3. The improved slide valve of claim 2 where, a portion of the refractory material on the cone extends downwardly to adjacent the circumferentially extending attachment stub between them.

4. The improved slide valve of claim 1 where, the orifice plate and guide assembly are a monolithic structure.

5. The improved slide valve of claim 1 where, the orifice plate and guide assembly are welded into a unitary structure.

* * * * *